United States Patent
Martinez et al.

(10) Patent No.: US 8,812,417 B2
(45) Date of Patent: *Aug. 19, 2014

(54) HIERARCHICAL BASED SEQUENCING MACHINE LEARNING MODEL

(75) Inventors: Tony Ramon Martinez, Orem, UT (US); Xinchuan Zeng, Orem, UT (US); Richard Glenn Morris, Sandy, UT (US)

(73) Assignee: Insidesales.com, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,000

(22) Filed: Aug. 20, 2012

(65) Prior Publication Data

US 2014/0052678 A1 Feb. 20, 2014

(51) Int. Cl.
*G06E 1/00* (2006.01)
*G06F 15/18* (2006.01)
*G06G 7/00* (2006.01)

(52) U.S. Cl.
USPC ............................................................ 706/21

(58) Field of Classification Search
None
See application file for complete search history.

(56) References Cited

U.S. PATENT DOCUMENTS

| | | | |
|---|---|---|---|
| 7,152,051 B1 * | 12/2006 | Commons et al. | 706/16 |
| 8,285,667 B2 | 10/2012 | Jaros et al. | |
| 2003/0140023 A1 | 7/2003 | Ferguson et al. | |
| 2005/0265607 A1 | 12/2005 | Chang | |
| 2007/0005539 A1 | 1/2007 | Bergman et al. | |
| 2008/0249844 A1 | 10/2008 | Abe et al. | |
| 2009/0157571 A1 | 6/2009 | Smith et al. | |
| 2009/0176580 A1 | 7/2009 | Herrmann et al. | |
| 2010/0145678 A1 | 6/2010 | Csomai et al. | |
| 2010/0280827 A1 | 11/2010 | Mukerjee et al. | |
| 2011/0046970 A1 | 2/2011 | Fontenot | |
| 2011/0106735 A1 | 5/2011 | Weston et al. | |
| 2011/0106743 A1 * | 5/2011 | Duchon | 706/46 |
| 2011/0119213 A1 | 5/2011 | Elisseeff et al. | |
| 2011/0153419 A1 | 6/2011 | Hall | |
| 2011/0213741 A1 | 9/2011 | Shama et al. | |
| 2011/0270779 A1 | 11/2011 | Showalter | |
| 2012/0041727 A1 | 2/2012 | Mishra et al. | |
| 2012/0203720 A1 | 8/2012 | Baker | |

OTHER PUBLICATIONS

Seok-Beom Roh et al., "A fussy ensemble of parallel polynomial neural networks with information granules formed by fuzzy clustering" in Knowledge Based Systems vol. 23 pp. 202-219 (2010).*
Notice of Allowance mailed Dec. 13, 2012 in related U.S. Appl. No. 13/590,028.
Notice of Allowance mailed Nov. 9, 2012 in related U.S. Appl. No. 13/590,028.
Leclercq et al. "Autonomous learning algorithm for fully connected recurrent networks", ESANN, 2003, pp. 379-384.
Bilmes et al. "Generalized rules for combination and joint training of classifiers", FAA 2003, pp. 201-211.

(Continued)

*Primary Examiner* — Kakali Chaki
*Assistant Examiner* — Mario Riojas Ramirez
(74) *Attorney, Agent, or Firm* — Maschoff Brennan

(57) ABSTRACT

A hierarchical based sequencing (HBS) machine learning model. In one example embodiment, a method of employing an HBS machine learning model to predict multiple interdependent output components of an MOD output decision may include determining an order for multiple interdependent output components of an MOD output decision. The method may also include sequentially training a classifier for each component in the selected order to predict the component based on an input and based on any previous predicted component(s).

25 Claims, 11 Drawing Sheets

(56) References Cited

OTHER PUBLICATIONS

International Search Report and Written Opinion mailed Feb. 28, 2014 in related PCT Application No. PCT/US13/55856.

International Search Report and Written Opinion dated Mar. 6, 2014 in related PCT Application No. PCT/US2013/055859.

International Search Report and Written Opinion dated Apr. 14, 2014 in related PCT Application No. PCT/US2013/077260.

* cited by examiner

Lead Source: Trade Show
Lead Title: Marketing Director
Lead Industry: Software
Lead State: Utah
Lead Created Date: 5/9/2010 10:15:21
Lead Company Size: 100
Lead Status: New
Number Of Previous Dials: 2
Number Of Previous Emails: 1
Previous Action: Email
Hours Since Last Action: 51.216

HIERARCHICAL BASED SEQUENCING MACHINE LEARNING MODEL

FIELD

The embodiments discussed herein are related to a hierarchical based sequencing (HBS) machine learning model.

BACKGROUND

Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

One main difficulty in machine learning lies in the fact that the set of all possible behaviors, given all possible inputs, is too large to be covered by a set of training data. Hence, a machine learning model must generalize from the training data so as to be able to produce a useful output in new cases.

One example of machine learning is traditional structured prediction (SP). Traditional SP is a single model approach to dependent output. With SP, once an input feature vector x is specified, a single correct output vector z can be fully specified. Thus the output vector z is fully conditioned on the input feature vector x and the different output components of output vector z ($z_1, z_2, \ldots$) are conditionally independent of each other given the input feature vector x. Thus, the probability of $z_1$ given x is equal to the probability of $z_1$ given x and $z_2$, or $p(z_1|x)=p(z_1|x, z_2)$. However, traditional SP cannot handle an interdependent relationship between different output components. In addition, traditional SP cannot handle a problem having multiple correct output decisions for a given input.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to methods of employing a hierarchical based sequencing (HBS) machine learning model to predict multiple interdependent output components of a multiple output dependency (MOD) output decision. The example methods disclosed herein may be employed to solve MOD problems.

In one example embodiment, a method includes employing a machine learning model to predict multiple interdependent output components of an MOD output decision.

In another example embodiment, a method of employing an HBS machine learning model to predict multiple interdependent output components of an MOD output decision may include determining an order for multiple interdependent output components of an MOD output decision. The method may also include sequentially training a classifier for each component in the selected order to predict the component based on an input and based on any previous predicted component(s).

In yet another example embodiment, a method of employing an HBS machine learning model to predict multiple interdependent output components of an MOD output decision may include selecting an order for multiple interdependent output components of an MOD output decision. The method may also include training a first classifier to predict the first component in the selected order based on an input. The method may further include training a second classifier to predict the second component in the selected order based on the input and based on the first predicted component.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 7 illustrates an example computer screen image of a user interface of an example LRM system;

FIG. 8B illustrates an example computer screen image of the example lead advisor display of FIG. 8A after a lead has been selected by an agent.

DESCRIPTION OF EMBODIMENTS

Some embodiments described herein include methods of employing a hierarchical based sequencing (HBS) machine learning model to predict multiple interdependent output components of a multiple output dependency (MOD) output decision. The example methods disclosed herein may be employed to solve MOD problems.

As used herein, the term "multiple output dependency" or "MOD" refers to an output decision, or a problem having an output decision, that includes multiple output components which are interdependent in that each component is dependent not only on an input but also on the other components.

Some example MOD problems include, but are not limited to: 1) which combination of stocks to purchase to balance a mutual fund given current stock market conditions, 2) which combination of players to substitute into a lineup of a sports team given the current lineup of the opposing team, and 3) which combination of shirt, pants, belt, and shoes to wear given the current weather conditions. In each of these examples, each component of the output decision depends on both the input (current stock market conditions, an opposing team lineup, or current weather conditions) and the other components (the other stocks purchased, the other substituted player, or the other clothing selected). Other examples of MOD problems may relate to hostage negotiations, retail sales, online shopping carts, web content management systems, customer service, contract negotiations, or crisis management, or any other situation that requires an output decision with multiple interdependent output components.

Another example MOD problem is lead response management (LRM). LRM is the process of responding to leads in a manner that optimizes contact or qualification rates. Leads may come from a variety of sources including, but not limited to, a web form, a referral, and a list purchased from a lead vendor. When a lead comes into an organization, the output decision of how to respond to the lead may include multiple interdependent components such as, but not limited to, who should respond to the lead, what method should be employed to respond to the lead, what content should be included in the response message, and when should the response take place. Each of these components of the output decision depends on both the input (the lead information) and the other components. For example, the timing of the response may depend on the availability of the person selected to respond. Also, the content of the message may depend on the method of response (e.g. since the length of an email message is not limited like the length of a text message). Although the example methods disclosed herein are generally explained in the context of LRM, it is understood that the example methods disclosed herein may be employed to solve any MOD problem.

Example embodiments will be explained with reference to the accompanying drawings.

Figure 1:
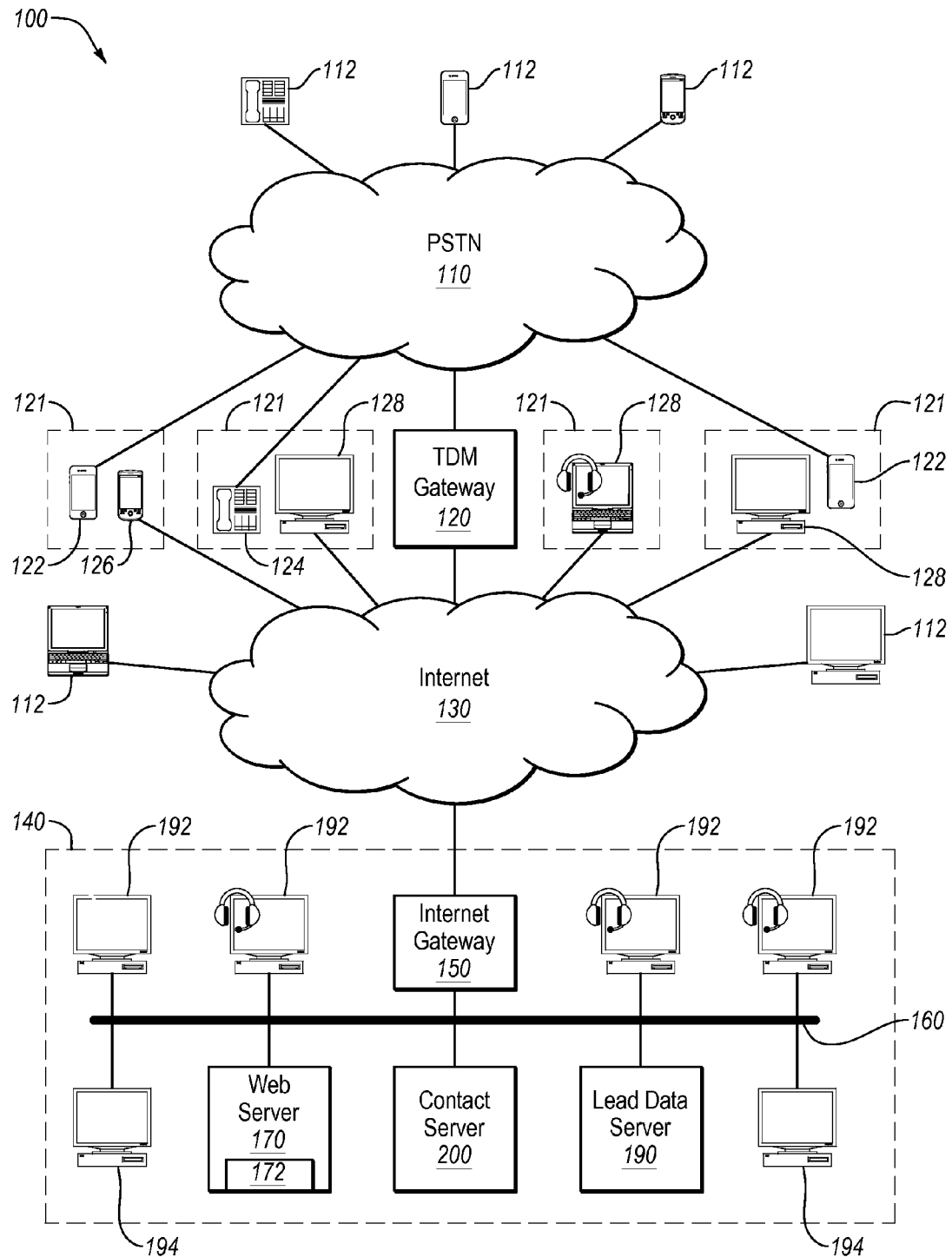
FIG. 1 is a schematic block diagram illustrating an example lead response management (LRM) system including an example contact server.

FIG. 1 is a schematic block diagram illustrating an example LRM system 100. As depicted, the example LRM system 100 includes various components such as a public switched telephone network (PSTN) 110, user communication and/or computing devices 112, a TDM gateway 120 connecting the PSTN 100 to an internet 130, remote agent stations 121, workstations 128, a call center 140, an internet gateway 150 connecting a local area network 160 to the internet 130, a web server 170, a contact server 200, a lead data server 190, local agent workstations 192, and control workstations 194. The various components of the example LRM system 100 operably interconnected to collaboratively improve a process of responding to leads in a manner that optimizes contact or qualification rates.

As disclosed in FIG. 1, the remote agent stations 121 include wireless phones 122, wired phones 124, wireless computing devices 126, and workstations 128. In certain embodiments, the wireless phones 122 or the wired phones 124 may be voice over internet protocol (VOIP) phones. In some embodiments, the computing devices 126 or the workstations 128 may be equipped with a soft phone. The remote agent stations 121 enable agents to respond to lead from remote locations similar to agents stationed at the workstations 192 and directly connected to the local area network 160.

In one example embodiment, the local area network 160 resides within a call center 140 that uses VoIP and other messaging services to contact users connected to the PSTN 110 and/or the internet 130. The various servers in the call center 140 function cooperatively to acquire leads, store lead information, analyze lead information to decide how best to respond to each lead, distribute leads to agents via agent terminals such as the local agent workstations 192 and the remote agent stations 121 for example, facilitate communication between agents and leads via the PSTN 110 or the internet 130 for example, track attempted and successful agent interaction with leads, and store updated lead information.

The web server 170 may provide one or more web forms 172 to users via browser displayable web pages. The web forms may be displayed to the users via a variety of communication and/or computing devices 112 including phones, smart phones, tablet computers, laptop computers, desktop computers, media players, and the like that are equipped with a browser. The web forms 172 may prompt the user for contact data such as name, title, industry, company information, address, phone number, fax number, email address, instant messaging address, referral information, availability information, and interest information. The web server 170 may receive the lead information associated with the user in response to the user submitting the web form and provide the lead information to contact server 200 and the lead data server 190, for example.

The contact server 200 and the lead data server 190 may receive the lead information and retrieve additional data associated with the associated user such as web analytics data, reverse lookup data, credit check data, web site data, web site rank information, do-not-call registry data, data from a customer relationship management (CRM) database, and background check information. The lead data server 190 may store the collected data in a lead profile (not shown) and associate the user with an LRM plan (not shown).

The contact server 200 may contact a lead in accordance with an associated LRM plan and deliver lead information to an agent to enable the agent to respond to the lead in a manner that optimizes contact or qualification rates. The particular purpose of such contact or qualification may include, for example, establishing a relationship with the lead, thanking the lead for their interest in a product, answering questions from the lead, informing the lead of a product or service offering, selling a product or service, surveying the lead on their needs and preferences, and providing support to the lead. The contact server 200 may deliver the information to the agent using a variety of delivery services such as email services, instant messaging services, short message services, enhanced messaging services, text messaging services, telephony-based text-to-speech services, and multimedia delivery services. The agent terminals 121 or 192 may present the lead information to the agent and enable the agent to respond to the lead by communicating with the lead.

Figure 2:
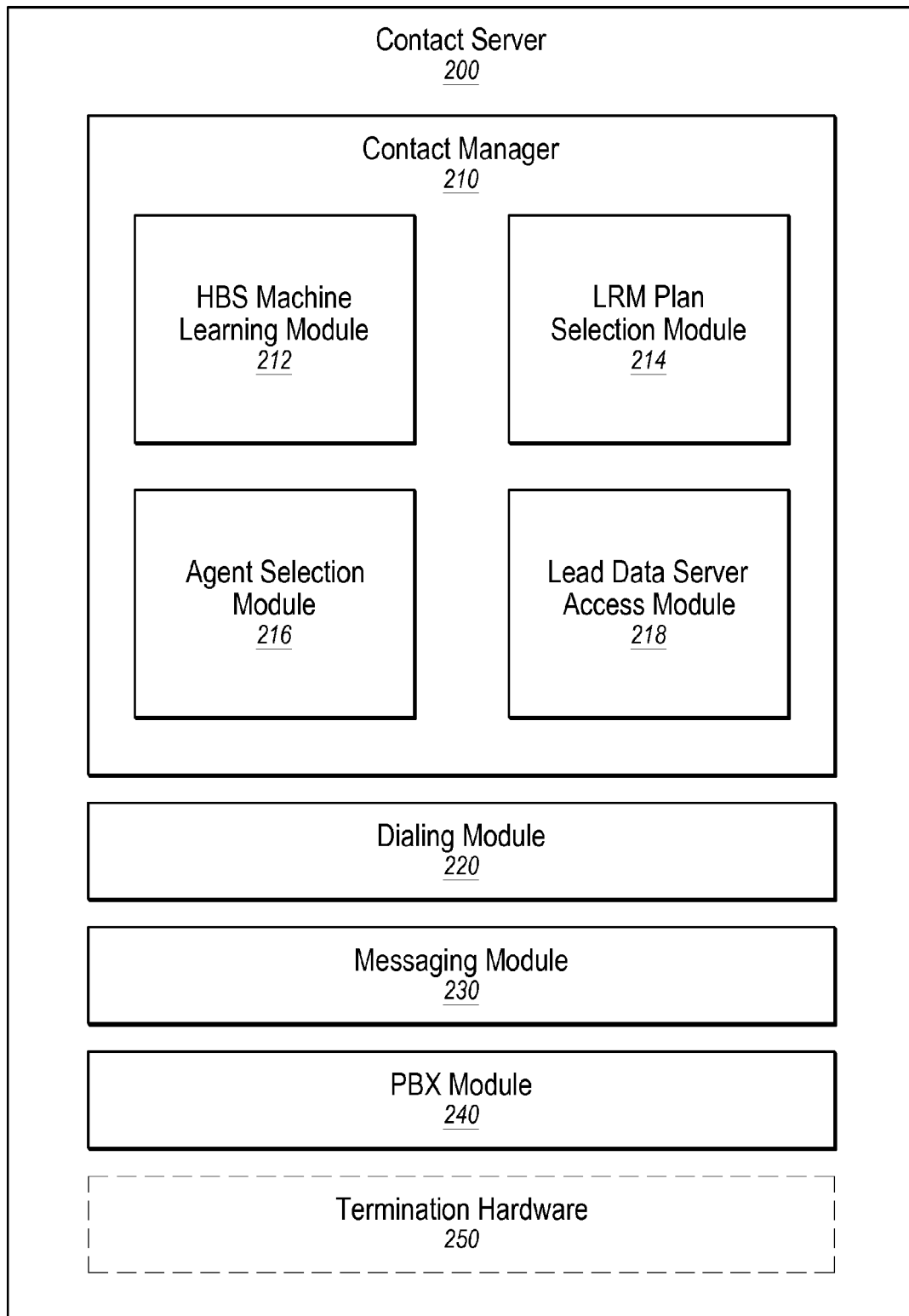
FIG. 2 is a schematic block diagram illustrating additional details of the example contact server of FIG. 1.

FIG. 2 is a schematic block diagram illustrating additional details of the example contact server 200 of FIG. 1. As disclosed in FIG. 2, the contact server 200 includes a contact manager 210, a dialing module 220, a messaging module 230, a PBX module 240 and termination hardware 250. In the depicted embodiment, the contact manager includes an HBS machine learning module 212, an LRM plan selection module 214, an agent selection module 216, and a lead data server access module 218. Although shown within the contact server 200, the depicted modules may reside partially or wholly on other servers such as the web server 170 and the lead data server 190 for example. The contact server 200 enables an agent to communicate with a lead in conjunction with an LRM plan.

The contact manager 210 establishes contact with users and agents and manages contact sessions where needed. The contact manager 210 may initiate contact via the dialing module 220 and/or the messaging module 230.

The HBS machine learning module 212 employs an HBS machine learning model to predict multiple interdependent output components of an MOD output decision, according to the example methods disclosed herein. In at least some example embodiments, the HBS machine learning module 212 utilizes the lead data server access module 208 to access and analyze lead information stored on the lead data server 190 of FIG. 1. Once one or more response decisions are predicted for a particular lead, the one or more response decisions may be conveyed to the LRM plan selection module 214.

The LRM plan selection module 214 presents and or selects one or more LRM plans for a particular lead and/or offering. Similarly, the agent selection module 216 selects an agent, class of agent, or agent skill set that is designated in each LRM plan.

The lead data server access module 218 enables the contact manager 210 to access lead information that is useful for contacting a lead. In one embodiment, the data storage access module 218 enables the contact manager 210 to access the lead data server 190.

The dialing module 220 establishes telephone calls including VOIP telephone calls and PSTN calls. In one embodiment, the dialing module 220 receives a unique call identifier, establishes a telephone call, and notifies the contact manager 210 that the call has been established. Various embodiments of the dialing module 220 incorporate auxiliary functions such as retrieving telephone numbers from a database, comparing telephone numbers against a restricted calling list, transferring a call, conferencing a call, monitoring a call, playing recorded messages, detecting answering machines, recording voice messages, and providing interactive voice response (IVR) capabilities. In some instances, the dialing module 220 directs the PBX module 240 to perform the auxiliary functions.

The messaging module 230 sends and receives messages to agents and leads. To send and receive messages, the messaging module 230 may leverage one or more delivery or messaging services such as email services, instant messaging services, short message services, text message services, and enhanced messaging services.

The PBX module 240 connects a private phone network to the PSTN 110. The contact manager 210 or dialing module 220 may direct the PBX module 240 to connect a line on the private phone network with a number on the PSTN 110 or internet 130. In some embodiments, the PBX module 240 provides some of the auxiliary functions invoked by the dialing module 220.

The termination hardware 250 routes calls from a local network to the PSTN 110. In one embodiment, the termination hardware 250 interfaces to conventional phone terminals. In some embodiments and instances, the termination hardware 250 provides some of the auxiliary functions invoked by the dialing module 220.

Having described a specific environment (an LRM system) and specific application (LRM) with respect to FIGS. 1 and 2, it is understood that this specific environment and application is only one of countless environments and application in which example embodiments may be employed. The scope of the example embodiments are not intended to be limited to any particular environment or application.

Figure 3A:
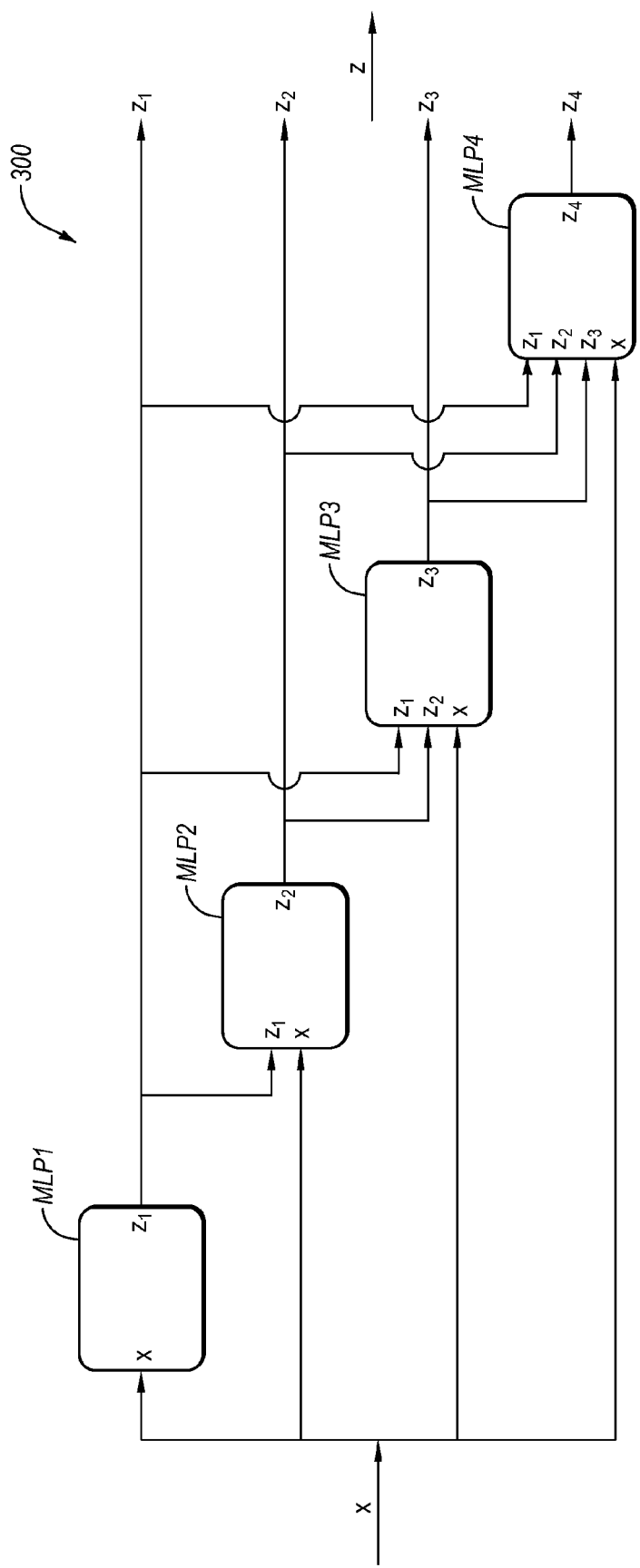
FIG. 3A is a schematic flow chart diagram illustrating an example hierarchical based sequencing (HBS) machine learning model.

FIG. 3A is a schematic flow chart diagram illustrating an example HBS machine learning model 300. The model 300 is configured to be employed in sequential decision making to predict multiple interdependent output components, namely $z_1$, $z_2$, $z_3$, and $z_4$, of an MOD output decision z. Although the output decision z includes four (4) components, it is understood that an HBS machine learning model could be employed in connection with any output decision having two (2) or more interdependent components. The model 300 may be trained based on recorded historical data so that it can make optimal (or near-optimal) decisions, especially when a decision is comprised of many variables that need to be determined at the same time.

Although the model 300 may be employed in any number of applications to produce MOD output decisions, the model 300 is employed in FIG. 3A to produce an LRM MOD output decision. In particular, the model 300 is employed to decide for a given lead what response should be performed next in a sequence that will optimize the contact or qualification of the lead.

For example, the model 300 may be employed to produce an LRM MOD output decision $z=(z_1, z_2, z_3, z_4)$, where $z_1$, $z_2$, $z_3$, and $z_4$ are four components of the output decision z, based on an input x. In this example, $z_1$=response agent title, $z_2$=response method, $z_3$=response message type, and $z_4$=response timing. The input x may be an input feature vector that includes information about a particular lead.

It is understood that the components of response agent title, response method, response message type, and response timing are only example components of an LRM MOD output decision. Other example components may include, but are not limited to, agent or lead demographic profile, agent or lead histographic profile (i.e. a profile of events in the life of the agent or the lead which could include past interactions between the agent and the lead), lead contact title (i.e. the title of a particular contact person within a lead organization), agent or lead psychographic profile (i.e. a profile of the psychological characteristics of the agent or the lead), agent or lead social network profile (i.e. the proximity of the agent to the lead in an online social network such as LinkedIn® or FaceBook® or in an offline social network such as the Entrepreneurs Organization®, civic clubs, fraternities, or religions), agent or lead geographic profile (i.e. cities, states, or other geographic designations that define current and/or past locations of the agent or the lead), response frequency (i.e. how often an agent contacts a lead), and response persistence (i.e. how long an agent persists in contacting a lead).

Figure 3B:
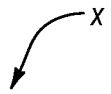
FIG. 3B is a text diagram illustrating an example input feature vector.

FIG. 3B is a text diagram illustrating an example input feature vector x. The example input feature vector x of FIG. 3B includes information about a particular lead. In particular, the example input feature vector x includes constant features about a lead, such as lead title and lead industry, and interactive features related to interactions between an agent and the lead, such as previous number of dials and previous action. The lead information provided by the example input feature vector x may be employed as input by the model 300 of FIG. 3A in order to determine what is the next sequential response that should be performed that will optimize the contact or qualification of the lead.

It is understood that the input features of lead source, lead title, lead industry, lead state, lead created date, lead company size, lead status, number of previous dials, number of previous emails, previous action, and hours since last action are only example input features to an LRM MOD output decision. Other example input features may include, but are not limited to, response agent title, response method, response message type, response timing, agent or lead demographic profile, agent or lead histographic profile, agent or lead psychographic profile, agent or lead social network profile, agent or lead geographic profile, response frequency, and response persistence. Additionally, input features could include data on current events, such as current events related to politics, economics, natural phenomena, society, and culture. It is further understood that where a particular input feature is employed as an input to a particular LRM MOD output decision, the particular input feature will not be included among the output components of the particular LRM MOD output decision.

As disclosed in FIG. 3A, there is a dependency among components $z_1$, $z_2$, $z_3$, and $z_4$. For example, a decision on the component $z_2$ (response method) may have an influence on the decision for the component $z_4$ (response timing). For example, if $z_2$=dial, an agent may need to consider when a lead is available to talk on a phone (e.g. usually during business hours of the time zone where the lead resides). If $z_2$=email, the agent may send the email at any time.

Therefore, in the example application of FIG. 3A, and as is the case with other MOD output decisions, the components of z are dependent both on an input x and on the other components of z. Thus, in this example, the probability of $z_1$ given x is not necessarily equal to the probability of $z_1$ given x and $z_2$, or $p(z_1|x) \neq p(z_1|x, z_2)$. In other words, it cannot be decided what value a specific component of z should take on without considering x and the values of the other components of z.

The model 300 of FIG. 3A employs a base classifier. In particular, and as disclosed in FIG. 3A, the model 300 employs multilayer perceptron ("MLP") neural networks MLP1, MLP2, MLP3, and MLP4 as base classifiers. It is understood, however, that the model 300 could alternatively employ other types of base classifiers including, but not limited to, other multilayer neural networks, decision trees, and support vector machines.

Figure 3C:
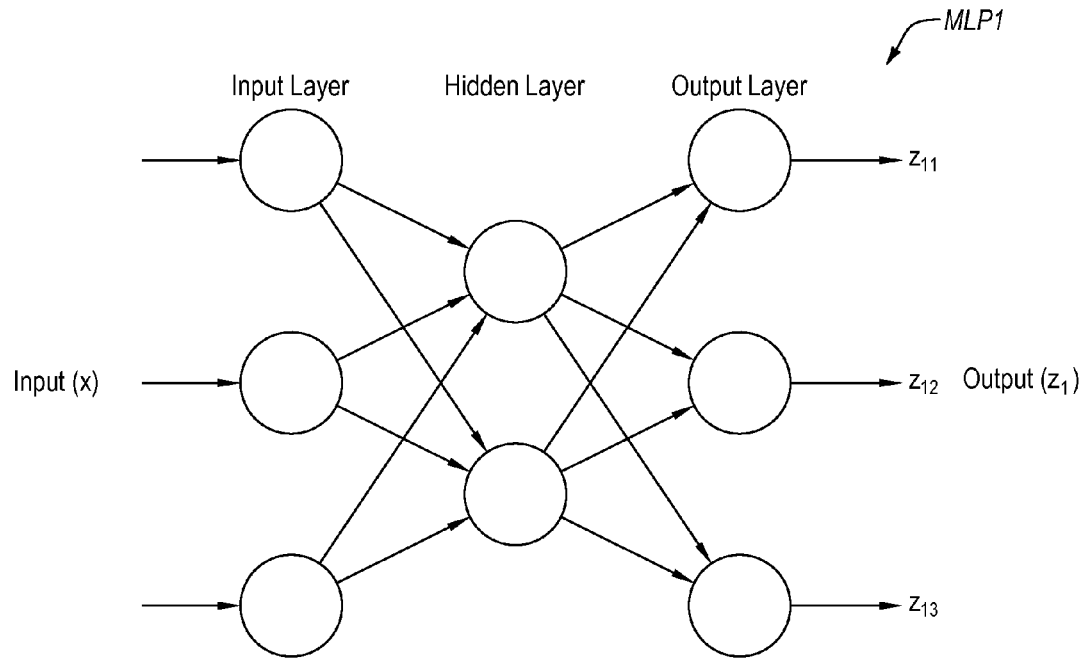
FIG. 3C is a schematic flow chart diagram illustrating a first example multilayer perceptron (MLP) neural network that is employed to predict a first interdependent output component based on the example input feature vector of FIG. 3B.

FIG. 3C is a schematic flow chart diagram illustrating the MLP neural network MLP1 that is employed to predict the first interdependent output component $z_1$ based on the input feature vector x of FIG. 3B. In FIG. 3C, the input feature vector x is received by an input layer of the MLP neural network MLP1 and then processed by a hidden layer and an output layer to predict $z_1 \in \{z_{11}, z_{12}, z_{13}\}$.

Figure 3D:
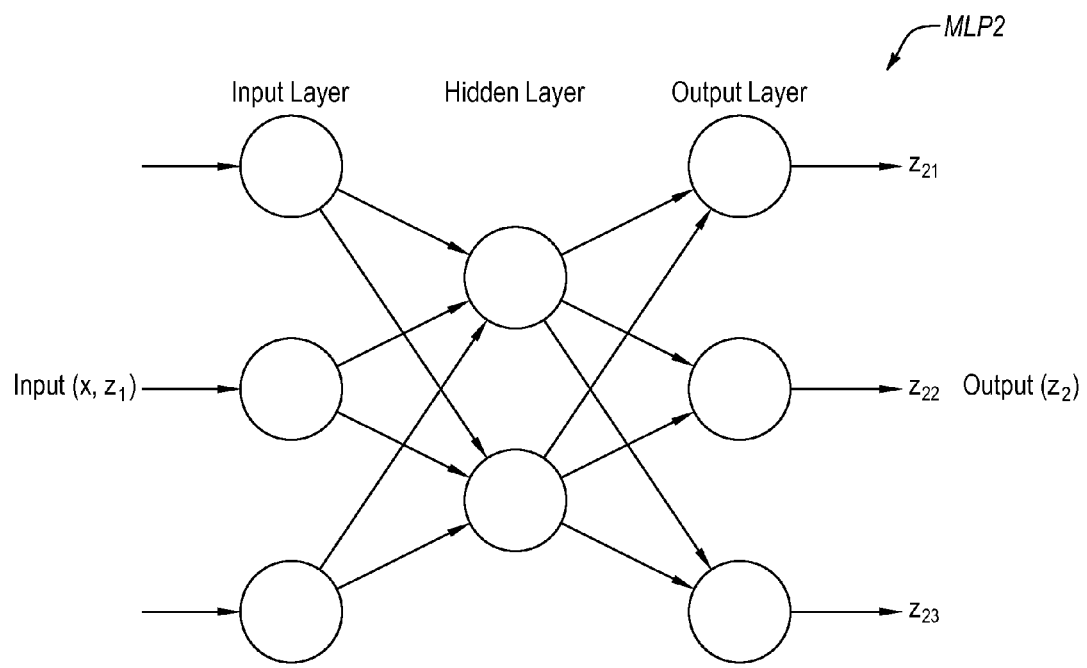
FIG. 3D is a schematic flow chart diagram illustrating a second example MLP neural network that is employed to predict a second interdependent output component based on the example input feature vector of FIG. 3B and based on the predicted first interdependent output component of FIG. 3C.

FIG. 3D is a schematic flow chart diagram illustrating the MLP neural network MLP2 that is employed to predict the second interdependent output component $z_2$ based on the input feature vector x of FIG. 3B and based on the predicted first interdependent output component $z_1$ of FIG. 3C. In FIG. 3D, the input feature vector x and the input $z_1$ are received by an input layer of the MLP neural network MLP2 and then processed by a hidden layer and an output layer to predict $z_2 \in \{z_{21}, z_{22}, z_{23}\}$.

Figure 4:
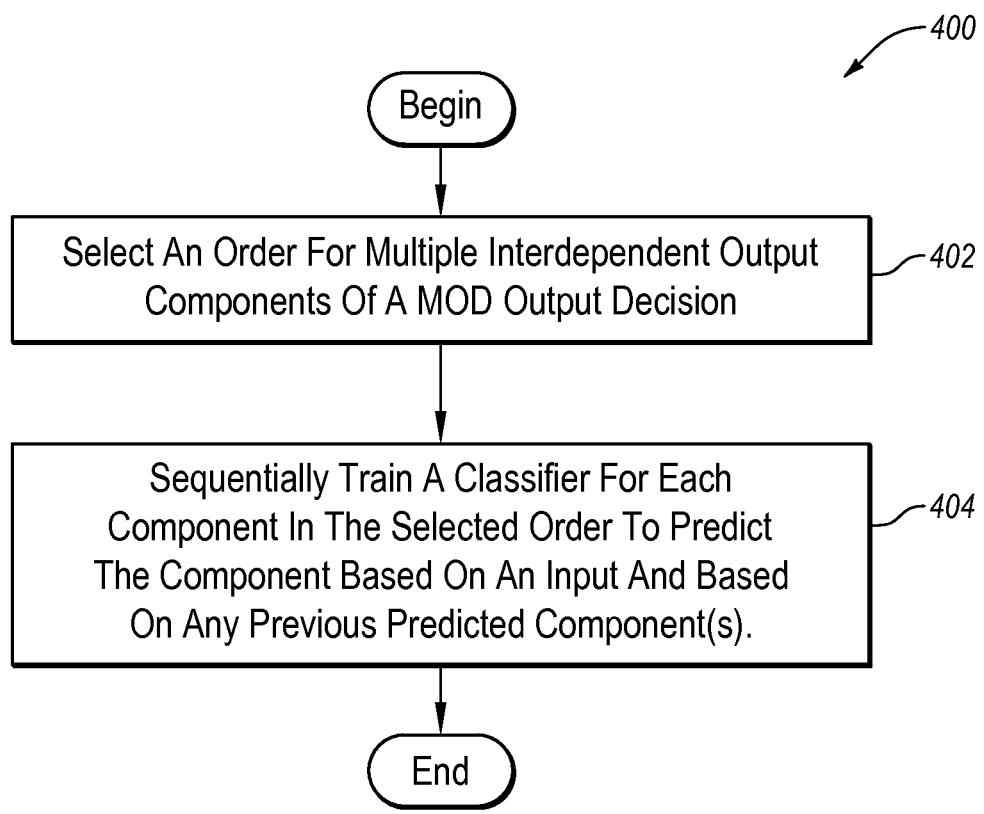
FIG. 4 is a schematic flow chart diagram of an example method of employing an HBS machine learning model to predict multiple interdependent output components of a multiple output dependency (MOD) output decision.

FIG. 4 is a schematic flow chart diagram of an example method 400 of employing an HBS machine learning model to predict multiple interdependent output components of an MOD output decision. The method 400 may be implemented, in at least some embodiments, by the HBS machine learning module 212 of the contact manager 210 of the contact server 210 of FIG. 1. For example, the HBS machine learning module 212 may be configured to execute computer instructions to perform operations of employing the HBS machine learning model 300 of FIG. 3A to predict multiple interdependent output components $z_1$, $z_2$, $z_3$, and $z_4$ of an MOD output decision z, as represented by one or more of blocks 402 and 404 of the method 400. Although illustrated as discrete blocks, various blocks may be divided into additional blocks, combined into fewer blocks, or eliminated, depending on the desired implementation. The method 400 will now be discussed with reference to FIGS. 1-4.

The method 400 may begin at block 402, in which an order is selected for multiple interdependent output components of an MOD output decision. For example, the HBS machine learning module 212 may select an order for the multiple interdependent output components $z_1$, $z_2$, $z_3$, and $z_4$ of the MOD output decision z. The MOD output decision z has four components including response agent title, response method, response message type, and response timing. One possible order that could be selected is response agent title, response method, response message type, and response timing. Another possible order may be response method, response agent title, response message type, and response timing.

Various methods may be employed to determine the order of the output components. For example, one method to determine the order may include trying all possible orders on testing data and then selecting the one with the best overall performance. In the example embodiment disclosed in FIG. 3A, the order has been selected to be $z_1$=response agent title, $z_2$=response method, $z_3$=response message type, and $z_4$=response timing.

In block 404, a classifier for each component in the selected order is sequentially trained to predict the component based on an input and based on any previous predicted component(s). For example, the HBS machine learning module 212 may sequentially train the MLP neural networks MLP1, MLP2, MLP3, and MLP4 to predict the components $z_1$, $z_2$, $z_3$, and $z_4$ in the selected order based on the input feature vector x of FIG. 3B and based on any previous predicted component(s). Thus, MLP1 is trained from $(x; z_1)$ to predict response agent title $z_1$ using x as input; MLP2 is trained from $(x, z_1; z_2)$ to predict response method $z_2$ using x and $z_1$ as input; MLP3 is trained from $(x, z_1, z_2; z_3)$ to predict response message type $z_3$ using x, $z_1$, and $z_2$ as input; and MLP4 is trained from $(x, z_1, z_2, z_3; z_4)$ to predict response timing $z_4$ using x, $z_1$, $z_2$, and $z_3$ as input.

In one example, assume that each component has three possible values as follows: $z_1 \in \{z_{11}, z_{12}, z_{13}\}$={sales vice president, sales manager, sales representative}; $z_2 \delta \{z_{21}, z_{22}, z_{23}\}$={call, email, fax}; $z_3 \in \{z_{31}, z_{32}, z_{33}\}$={MT1, MT2, MT3}; and $z_4 \in \{z_{41}, z_{42}, z_{43}\}$={short, medium, long}. As disclosed in FIGS. 3A and 3C, the MLP neural network MLP1 is first trained to predict $z_1$ based on x by generating three (3) output values $\{p(z_{11}), p(z_{12}), p(z_{13})\}$ for $z_1 \in \{z_{11}, z_{12}, z_{13}\}$. Next, as disclosed in FIGS. 3A and 3D, the MLP neural network MLP2 is trained to predict $z_2$ based on both x and results of MLP1 by generating nine (3·3=9) output values as follows: $p(z_{11}, z_{21})=p(z_{11}) \cdot mlp2(x, z_1=z_{11}; z_2=z_{21})$; $p(z_{11}, z_{22})=p(z_{11}) \cdot mlp2(x, z_1=z_{11}; z_2=z_{22})$; $p(z_{12}, z_{21})=p(z_{12}) \cdot mlp2(x, z_1=z_{12}; z_2=z_{21})$; etc. As disclosed in FIG. 3A, the MLP neural network MLP3 is next trained to predict $z_3$ based on both x and the results of MLP1 and MLP2 by generating twenty-seven (3·3·3=27) output values, and MLP4 is trained to predict $z_4$ based on both x and the results of MLP1, MLP2, and MLP3 by generating eighty-one (3·3·3·3=81) output values. The eighty-one (81) possible output decisions may then be sorted based on output values, and the output decision with the highest output values may be chosen as the predicted output decision z.

In at least some example embodiments, the eighty-one (81) output values may be scaled in order to more easily handle multiplication of relatively small output values. For example, logarithmic output values for all eighty-one (81) possible output decisions may be calculated as follows: $\log(p(x; z_{1i}) \cdot p(x, z_{1i}; z_{2j}) \cdot p(x, z_{1i}, z_{2j}; z_{3k}) \cdot p(x, z_{1i}, z_{2j}, z_{3k}; z_{4l}))$; where $i \in \{1, 2, 3\}$; $j \in \{1, 2, 3\}$; $k \in \{1, 2, 3\}$; and $l \in \{1, 2,$ 3}. It is understood that calculating logarithmic output values is just one example of scaling output values, and other scaling techniques may be employed. It is further understood that the scaling of the (81) output values may be omitted in at least some example embodiments.

It is understood that this is but one example of sequentially training a classifier for each component in the selected order to predict the component based on an input and based on any previous predicted component(s), and the block 404 is not limited to the particular application of this example or to the LRM MOD problem solved in this example.

Figure 5:
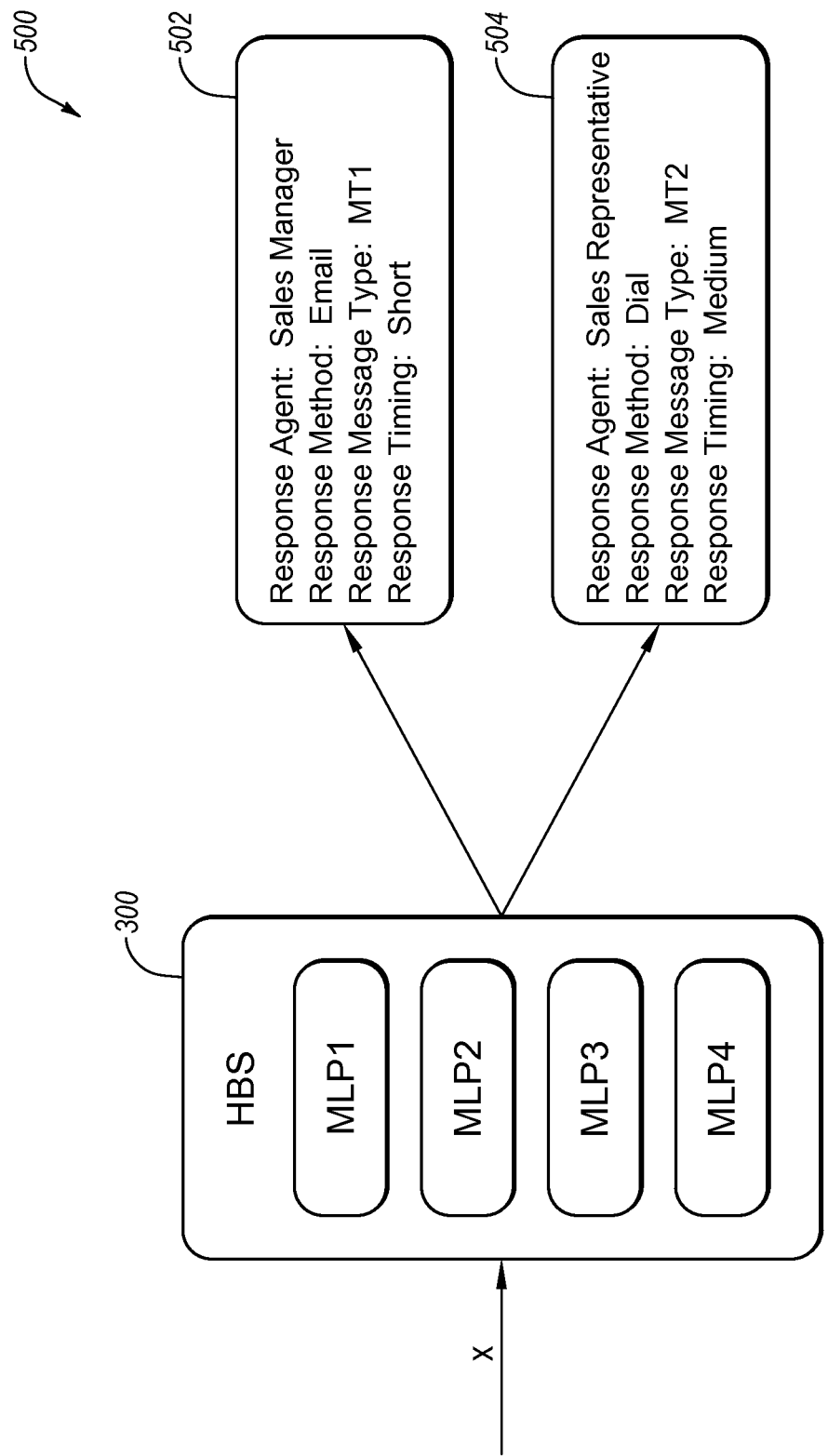
FIG. 5 is a schematic flow chart diagram of multiple correct MOD output decisions.

FIG. 5 is a schematic flow chart diagram 500 of multiple correct MOD output decisions. As disclosed in the diagram 500, the HBS machine learning model 300 may generate multiple correct output decisions 502 and 504 for a given input feature vector x. Although in a typical decision making process it is usually assumed that there is a unique correct decision given a fixed input, for LRM MOD output decisions there may be multiple correct decisions which may all produce similar favorable results. A decision may be chosen among multiple correct decisions based on available resources. For example, if a particular response agent with response agent title $z_1$="sales manager" is not available at a particular time, then another correct decision with response agent title $z_1$="sales representative" may be made.

Where multiple output decisions are simultaneously considered to be correct, the term "correct" may refer to multiple output decisions each having a substantially similar output value. For example, each of the output decisions 502 and 504 of FIG. 5 may have an identical or substantially similar output value, which indicates that performing either output decision would produce similar favorable results. Additionally or alternatively, the term "correct" may refer to multiple output decisions each having an output value above a predetermined threshold. The threshold may be predetermined to be relatively high or relatively low, depending on the application. Although only two correct output decisions are disclosed in FIG. 5, it is understood that the HBS machine learning model 300 may generate more than two correct output decisions.

Having described example methods of employing an HBS machine learning model to predict multiple interdependent output components of an MOD output decision with respect to FIGS. 3A-5, example systems and user interfaces that enable agents to access and implement the resulting output decisions will be described with respect to FIGS. 6-8B. It is understood that these specific systems and user interfaces are only some of countless systems and user interfaces in which example embodiments may be employed. The scope of the example embodiments is not intended to be limited to any particular system or user interface.

Figure 6:
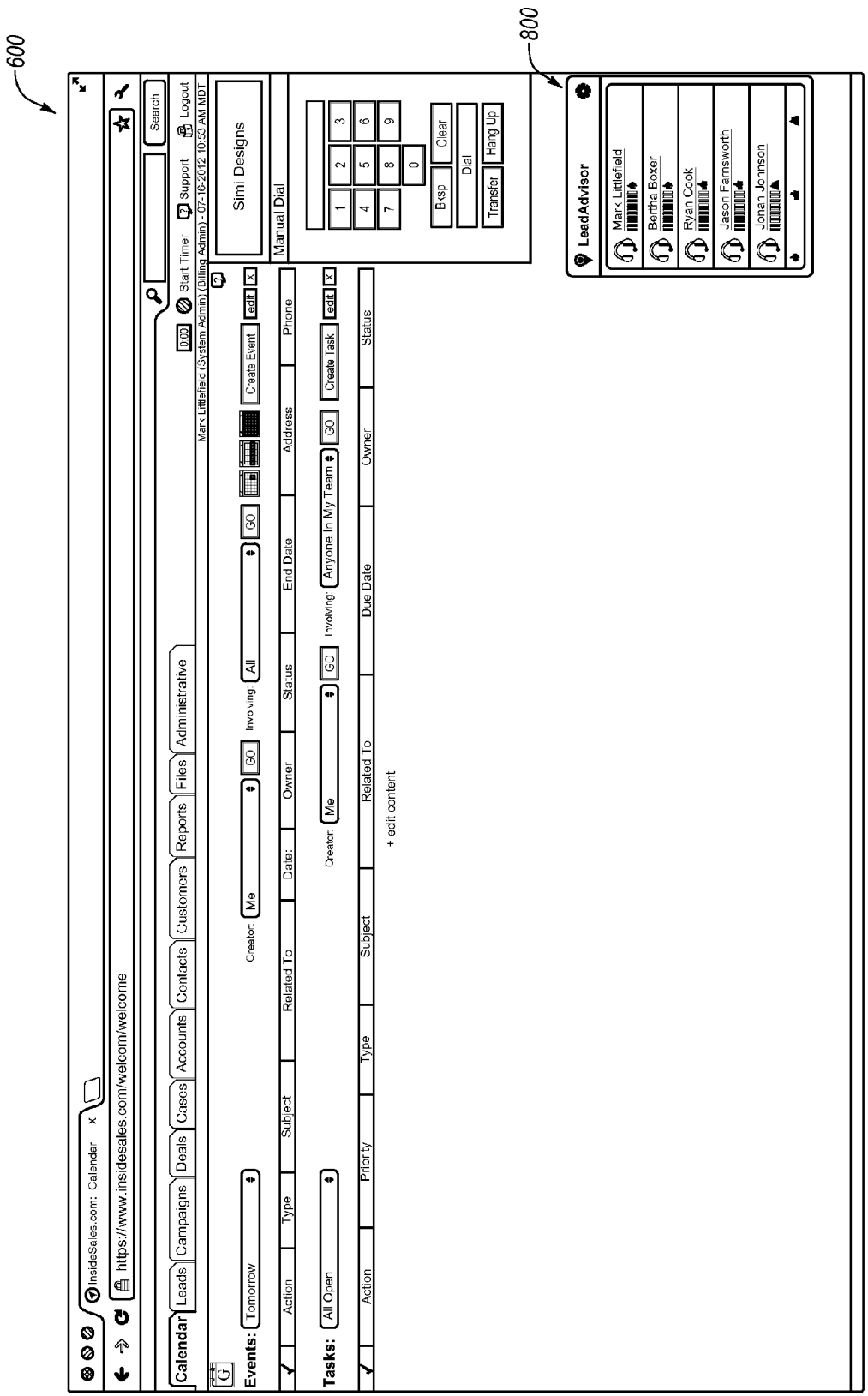
FIG. 6 illustrates an example computer screen image of a user interface of an example customer relationship management (CRM) system.

FIG. 6 illustrates an example computer screen image of a user interface 600 of an example customer relationship management (CRM) system. The user interface 600 includes various controls that allow an agent to manage customer relationships and, in particular, manage leads that are provided by the CRM system. The user interface 600 may be presented to an agent by the web server 170 on the workstations 128 or on the local agent workstations 192 of FIG. 1, for example. The agent may use the user interface 600 to respond to leads that have been previously stored on the lead data server 190 of FIG. 1. In particular, the lead advisor display 800 may allow the agent to respond to leads in a manner that optimizes contact or qualification rates, as discussed below in connection with FIGS. 8A and 8B.

Figure 7:
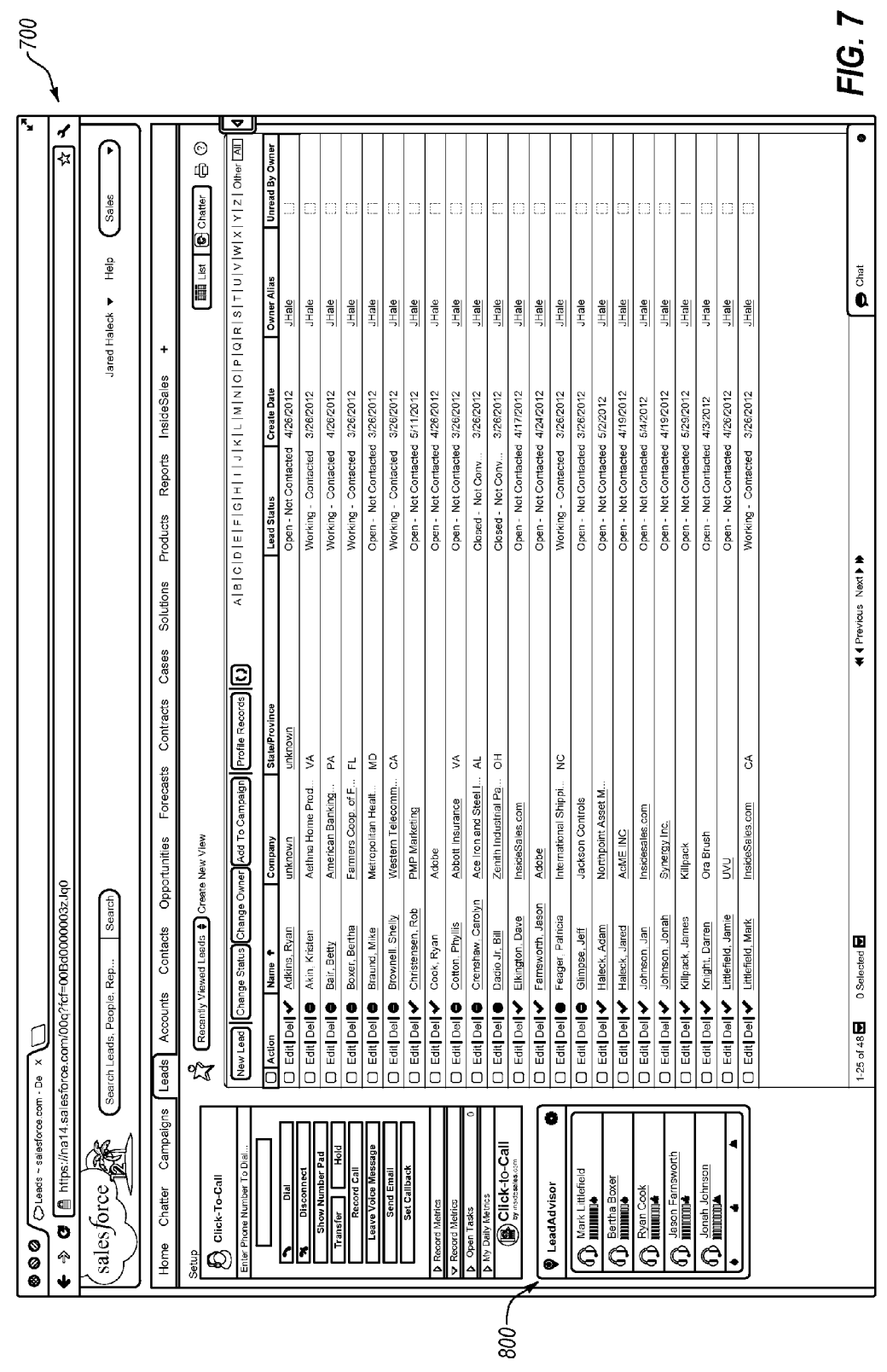

FIG. 7 illustrates an example computer screen image of a user interface 700 of an example LRM system, such as the LRM system of FIG. 1. Like the user interface 600 of FIG. 6, the user interface 700 includes various controls that allow an agent to respond to lead. The user interface 700 may be presented to an agent in a similar manner as the user interface 600. The user interface also includes a lead advisor display 800.

Figure 8A:
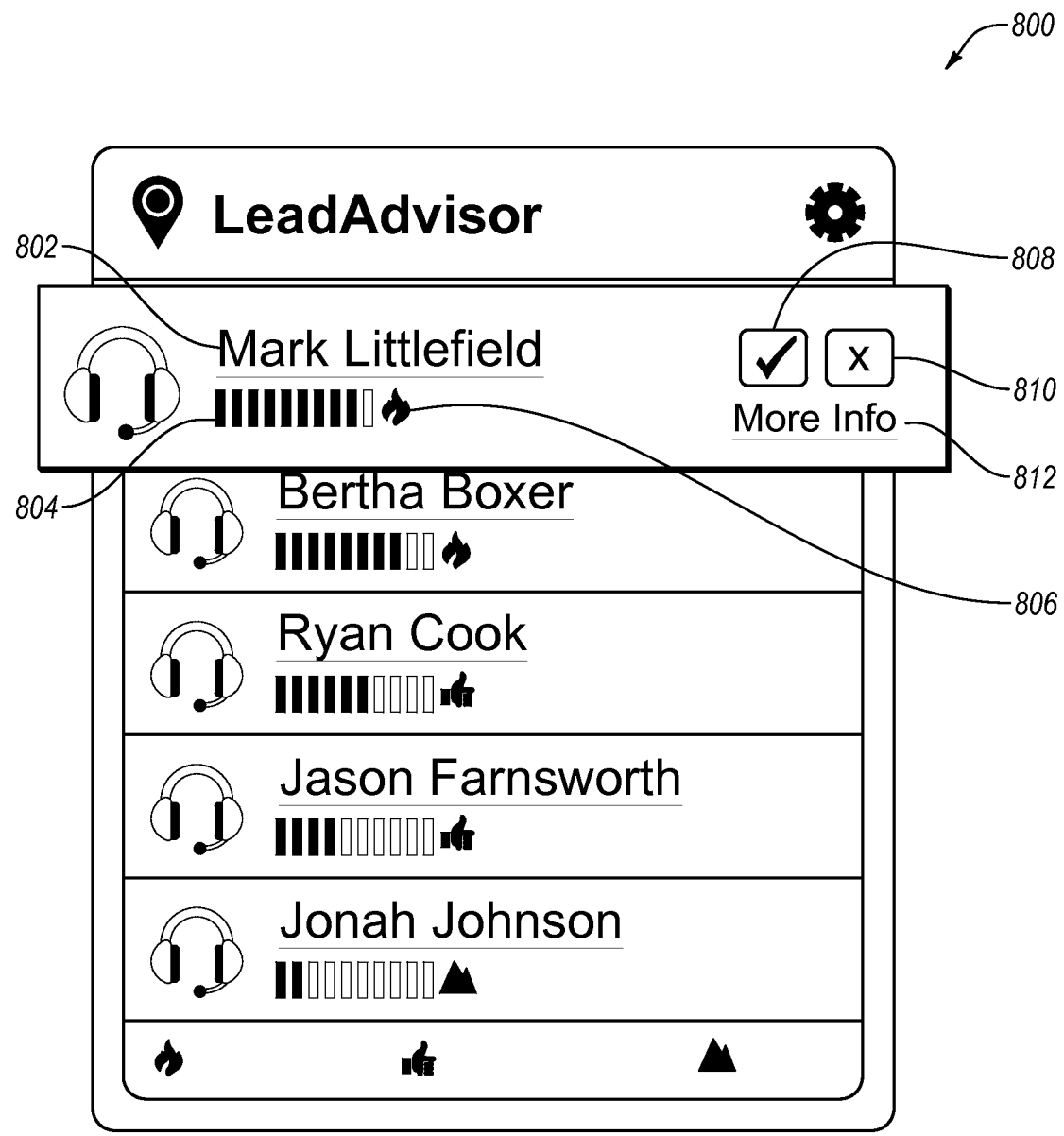
FIG. 8A illustrates an example computer screen image of an example lead advisor display before a lead has been selected by an agent.
Figure 8B:
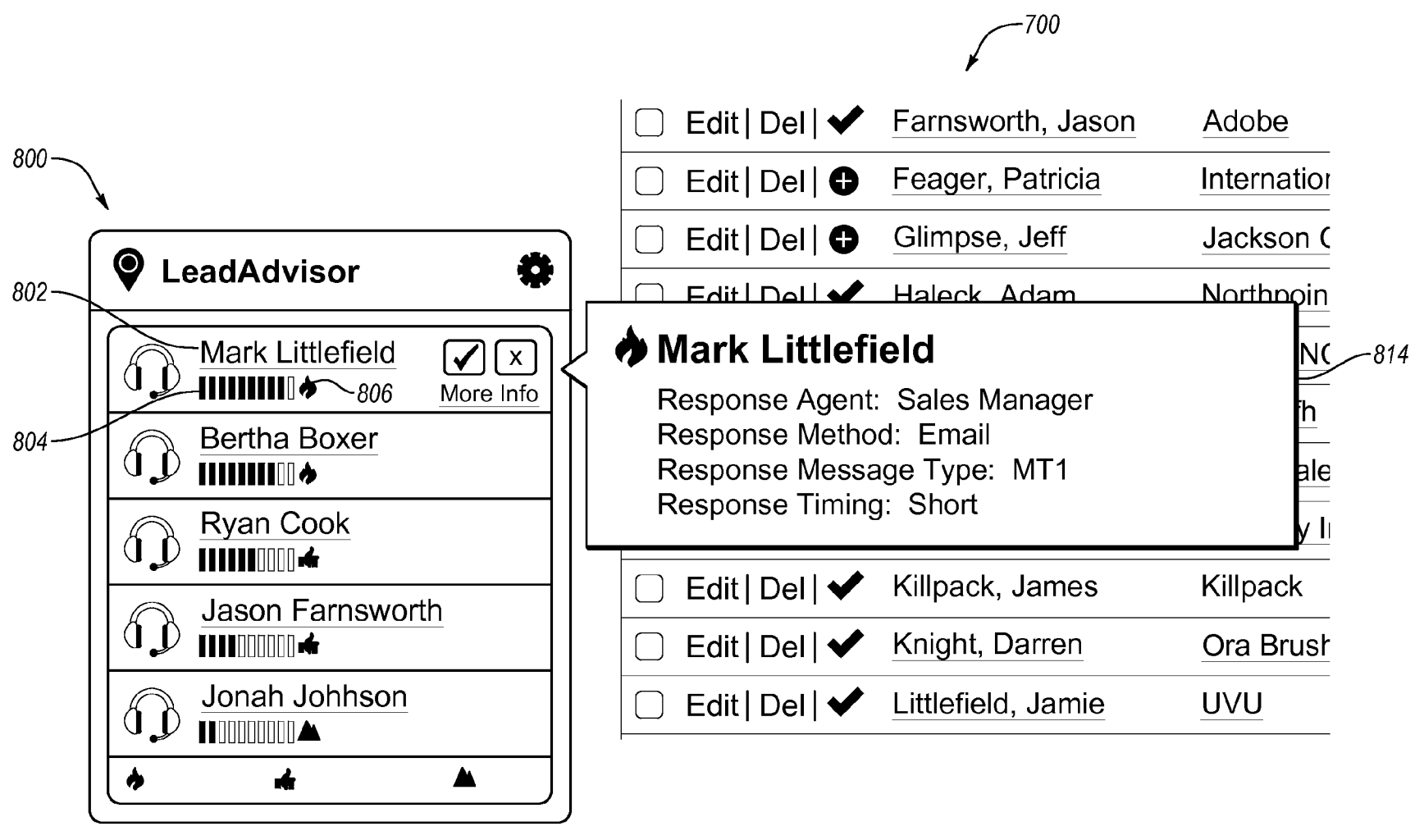

FIG. 8A illustrates an example computer screen image of the example lead advisor display 800 before a lead has been selected by an agent and FIG. 8B illustrates an example computer screen image of the example lead advisor display 800 after a lead has been selected by an agent. As disclosed in FIG. 8A, the lead advisor display 800 lists five leads. Each lead includes a name 802, a likelihood of success meter 804, and a likelihood of success category indicator 806. As disclosed in FIG. 8A, the leads are listed by highest likelihood of success to lowest likelihood of success. Upon inquiry by the agent, by mousing-over a lead with a mouse pointer for example, the lead may expand as shown in FIG. 8A for lead "Mark Littlefield." Upon expansion, the lead may present the agent with additional options, such as a confirm button 808, a delete button 810, and a "more info" link 812.

Upon selection of the "more info" link 812 by the agent, by clicking on the more info link 812 with a mouse pointer for example, the agent may be presented with a pop-out display 814 as disclosed in FIG. 8B. The pop-out display 814 may present the agent with an LRM plan associated with the lead. This LRM plan may have been generated by the example methods disclosed herein and may reflect the output decision with the highest, or among the highest, output value for the lead. As disclosed in FIG. 8B, the LRM plan for the lead named "Mark Littlefield" may include employing a sales manager to send an email with message type MT1 in a short timeframe, which corresponds to the output decision 502 of FIG. 5. The agent may then simply click on the pop-out display 814 to have the lead advisor display 800 automatically generate an email to the lead with message type MT1 that will be sent by a sales manager immediately. Alternatively, the agent may manually override the response plan and manually perform a different response.

Therefore, the embodiments disclosed herein include methods of employing an HBS machine learning model to predict multiple interdependent output components of an MOD output decision. The example methods disclosed herein enable the prediction of each output component based on an input and based on any previous predicted output component(s). Therefore, the example methods disclosed herein may be employed to solve MOD problems such as LRM problems.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" may refer to software objects or routines that execute on the computing system. The different modules described herein may be implemented as objects or processes that execute on the computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically recited examples and conditions.

What is claimed is:

1. A method comprising:
   employing a machine learning model to predict multiple interdependent distinctly-typed output components of a multiple output dependency (MOD) output decision, the employing including:
   predicting a first one of the output components using an input;
   predicting a second one of the output components using the same input and using the first one of the output components; and
   predicting a third one of the output components using the same input, using the first one of the output components, and using the second one of the output components.

2. The method as recited in claim 1, wherein the method results in multiple correct MOD output decisions.

3. The method as recited in claim 2, wherein each of the multiple correct MOD output decisions has a substantially similar output value.

4. A method of employing a hierarchical based sequencing (HBS) machine learning model to predict multiple interdependent output components of a multiple output dependency (MOD) output decision, the method comprising:
   selecting an order for three interdependent distinctly-typed output components of a MOD output decision; and
   sequentially training three classifiers for the three output components, respectively, in the selected order to predict the corresponding output component, wherein the first output component is predicted using an input, and the subsequent output components are predicted using the same input and using all previously predicted output component(s).

5. The method as recited in claim 4, wherein each classifier comprises a multilayer perceptron (MLP) neural network, another multilayer neural network, a decision tree, or a support vector machine.

6. The method as recited in claim 4, wherein the input comprises an input feature vector having two or more features.

7. The method as recited in claim 6, wherein the input feature vector includes constant features about a lead and interactive features related to interactions between an agent and the lead, the features of the input feature vector including one or more of lead source, lead title, lead industry, lead state, lead created date, lead company size, lead status, number of previous dials, number of previous emails, previous action, hours since last action, response agent title, response method, response message type, response timing, agent or lead demographic profile, agent or lead histographic profile, agent or lead psychographic profile, agent or lead social network profile, agent or lead geographic profile, response frequency, response persistence, and data on current events.

8. The method as recited in claim 7, wherein the MOD output decision is a lead response management (LRM) MOD output decision and the components include one or more of response agent title, response method, response message type, response timing, agent or lead demographic profile, agent or lead histographic profile, lead contact title, agent or lead psychographic profile, agent or lead social network profile, agent or lead geographic profile, response frequency, and response persistence.

9. The method as recited in claim 4, wherein the method results in multiple correct MOD output decisions.

10. The method as recited in claim 9, wherein each of the multiple correct MOD output decisions has an output value above a predetermined threshold.

11. A non-transitory computer-readable medium storing a program that causes a processor to execute the method according to claim 4.

12. A method of employing a hierarchical based sequencing (HBS) machine learning model to predict multiple interdependent output components of a multiple output dependency (MOD) output decision, the method comprising:
    selecting an order for multiple interdependent distinctly-typed output components of an MOD output decision;
    training a first classifier to predict the first component in the selected order using an input;
    training a second classifier to predict the second component in the selected order using the same input and using the first predicted component; and
    training a third classifier to predict the third component in the selected order using the same input, using the first predicted component, and using the second predicted component.

13. The method as recited in claim 12, further comprising:
    training one or more additional classifiers to predict one or more additional components in the selected order using the same input and using the previously predicted output components.

14. The method as recited in claim 12, where the first, second, and third classifiers each comprises a multilayer perceptron (MLP) neural network, another multilayer neural network, a decision tree, or a support vector machine.

15. The method as recited in claim 12, wherein the MOD output decision is a lead response management (LRM) MOD output decision and the input comprises an input feature vector including constant features about a lead and interactive features related to interactions between an agent and the lead, the features of the input feature vector including one or more of lead source, lead title, lead industry, lead state, lead created date, lead company size, lead status, number of previous dials, number of previous emails, previous action, hours since last action, response agent title, response method, response message type, response timing, agent or lead demographic profile, agent or lead histographic profile, agent or lead psychographic profile, agent or lead social network profile, agent or lead geographic profile, response frequency, response persistence, and data on current events.

16. The method as recited in claim 15, wherein the components include one or more of response agent title, response method, response message type, response timing, agent or lead demographic profile, agent or lead histographic profile, lead contact title, agent or lead psychographic profile, agent or lead social network profile, agent or lead geographic profile, response frequency, and response persistence.

17. The method as recited in claim 12, wherein the MOD output decision relates to sports, hostage negotiations, retail sales, online shopping carts, web content management systems, customer service, contract negotiations, or crisis management, or some combination thereof.

18. The method as recited in claim 12, wherein the method results in multiple correct MOD output decisions.

19. The method as recited in claim 18, wherein each of the multiple correct MOD output decisions has a substantially similar output value or has an output value above a predetermined threshold.

20. A non-transitory computer-readable medium storing a program that causes a processor to execute the method according to claim 12.

21. The method as recited in claim 4, wherein selecting the order for the at least three interdependent output components of the MOD output decision includes selecting the order from one of multiple different possible orders for the at least three interdependent output components of the MOD output decision.

22. A method of employing a hierarchical based sequencing (HBS) machine learning model to predict multiple interdependent output components of a multiple output dependency (MOD) output decision, the method comprising:

selecting an order for multiple interdependent output components of an MOD output decision; and sequentially training a classifier for each of the output components in the selected order to predict the output component based on an input and based on any previous predicted component(s), wherein the input comprises an input feature vector having two or more features, and wherein the input feature vector includes constant features about a lead and interactive features related to interactions between an agent and the lead, the features of the input feature vector including one or more of lead source, lead title, lead industry, lead state, lead created date, lead company size, lead status, number of previous dials, number of previous emails, previous action, hours since last action, response agent title, response method, response message type, response timing, agent or lead demographic profile, agent or lead histographic profile, agent or lead psychographic profile, agent or lead social network profile, agent or lead geographic profile, response frequency, response persistence, and data on current events.

23. The method as recited in claim 22, wherein the MOD output decision is a lead response management (LRM) MOD output decision and the components include one or more of response agent title, response method, response message type, response timing, agent or lead demographic profile, agent or lead histographic profile, lead contact title, agent or lead psychographic profile, agent or lead social network profile, agent or lead geographic profile, response frequency, and response persistence.

24. A method of employing a hierarchical based sequencing (HBS) machine learning model to predict multiple interdependent output components of a multiple output dependency (MOD) output decision, the method comprising:

selecting an order for multiple interdependent output components of an MOD output decision;

training a first classifier to predict the first component in the selected order based on an input; and training a second classifier to predict the second component in the selected order based on the input and based on the first predicted component, wherein the MOD output decision is a lead response management (LRM) MOD output decision and the input comprises an input feature vector including constant features about a lead and interactive features related to interactions between an agent and the lead, the features of the input feature vector including one or more of lead source, lead title, lead industry, lead state, lead created date, lead company size, lead status, number of previous dials, number of previous emails, previous action, hours since last action, response agent title, response method, response message type, response timing, agent or lead demographic profile, agent or lead histographic profile, agent or lead psychographic profile, agent or lead social network profile, agent or lead geographic profile, response frequency, response persistence, and data on current events.

25. The method as recited in claim 24, wherein the components include one or more of response agent title, response method, response message type, response timing, agent or lead demographic profile, agent or lead histographic profile, lead contact title, agent or lead psychographic profile, agent or lead social network profile, agent or lead geographic profile, response frequency, and response persistence.

* * * * *